United States Patent Office 3,707,434
Patented Dec. 26, 1972

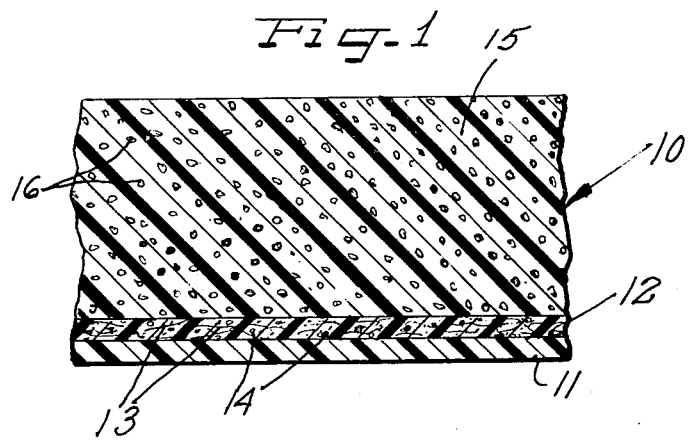
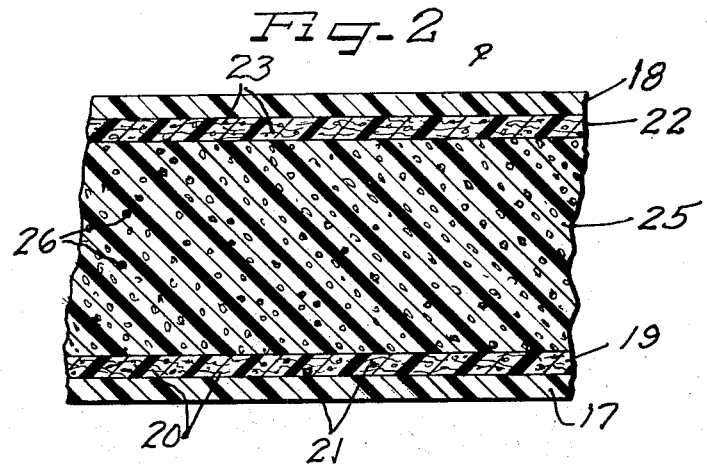
INVENTOR.
Vance A. Stayner

3,707,434
RIGIDIFIED RESINOUS LAMINATE
Vance A. Stayner, Wauconda, Ill., assignor to
Federal-Huber Corp., Chicago, Ill.
Continuation-in-part of applications Ser. No. 700,212,
Jan. 24, 1968 and Ser. No. 739,429, June 24, 1968.
This application Nov. 30, 1970, Ser. No. 93,733
Int. Cl. B32b 17/04, 19/02
U.S. Cl. 161—161
10 Claims

ABSTRACT OF THE DISCLOSURE

Rigidified plastic laminate having general utility as a sandwich panel, including an outer sheet of an acrylic resin, a layer of polyester resin bonded to the acrylic sheet, the layer containing glass fibers and solid inert spheres distributed therethrough, with a co-mingled layer of a polyester resin bonded to the first layer, the second layer being a syntactic layer of a polyester resin containing hollow plastic spheres in a stressed condition.

CROSS REFERENCES TO RELATED APPLICATIONS

This application is a continuation-in-part of my two co-pending applications, Ser. No. 700,212 filed Jan. 24, 1968 issued as U.S. Pat. No. 3,608,010 on Sept. 21, 1971 and Ser. No. 739,429 filed June 24, 1968, and issued as U.S. Pat. No. 3,582,388 on June 1, 1971.

BACKGROUND OF THE INVENTION

Field of the invention

This invention is in the field of laminated synthetic resin structures wherein one or both of the exterior surfaces consists of an acrylic resin sheet, the acrylic sheet being rigidified by means of a polyester resin containing glass fibers and solid glass beads, the acrylic reinforcing medium in turn being bonded to a syntactic foam of polyester resin containing hollow plastic spheres.

DESCRIPTION OF THE PRIOR ART

Various types of laminates involving glass fiber-polyester resin combinations have been used in the past. For example, boat hulls are sometimes built up from a laminated composition consisting of a ⅛ inch thickness of polyester resin-glass fibers, an intermediate layer of ½ inch end grained balsam wood, and an outer skin of ⅛ inch polyester-glass fiber layup. This structure is quite costly, particularly in view of the difficulty in securing the proper type of balsam, and has other disadvantages. For one, the balsam wood tends to absorb water. Secondly, the balsam cannot follow contours conveniently. In addition, the laminate has a limited core shear strength.

Other types of laminated compositions have made use of paper honeycombs as reinforcement materials. These compositions are subject to the disadvantages of limited core shear strength, and susceptibility to mildew attack.

Some attempts have been made to provide laminates using a core of a rigid polyurethane foam with polyester-glass fiber outer skins. This type of structure has the disadvantage that it requires expensive molds to produce the rigid urethane foam to the desired dimensions, and also is characterized by having a very low core shear strength.

SUMMARY OF THE INVENTION

The method of the present invention involves applying a coating composition including an uncured polyester resin to an acrylic backing sheet, the coating composition also including glass fibers and solid inert spheres. While the coating is still wet, a second polyester coating is applied over the first, consisting of a self-curing composition including a polyester resin, a curing agent for the polyester and hollow plastic spheres. The polyester resins are then set into a rigid polyester resin by means of an exothermic reaction which expands the hollow plastic spheres so that upon cooling, the hollow plastic spheres are left in a stressed state.

BRIEF DESCRIPTION OF THE DRAWINGS

FIG. 1 is an enlarged fragmentary cross-sectional view of a laminate produced according to the present invention;

FIG. 2 is an enlarged fragmentary cross-sectional view of a modified form of the present invention;

FIG. 3 is a greatly enlarged cross-sectional view of one of the glass spheres; and FIG. 4 is a greatly enlarged cross-sectional view of one of the plastic spheres.

DESCRIPTION OF THE PREFERRED EMBODIMENTS

In FIG. 1, reference numeral 10 indicates generally an improved laminate produced according to the present invention. An acrylic sheet 11 provides one of the exposed surfaces of the laminate. Any conventional acrylic sheet can be used for this purpose including acrylic copolymers. One of the most widely used acrylic resins is the "ABS" type resin which is a commercially available material employing varying proportions of styrene, acrylonitrile and polybutadiene. This material is prepared by dispersing an elastomeric or rubbery phase into a styrene-acrylonitrile resin phase, the two phases being produced by either emulsion, bulk, or suspension polymerization. The rubbery elastomeric phase can be composed of a variety of elastomers onto which styrene acrylonitrile resins have been grafted. The relative amounts of the components can be controlled to take maximum advantage of a single property or a set of properties. For example, hardness is generally a linear function of the elastomer content. Other physical properties such as tensile strength, impact and heat distortion are improved by increasing the molecular weight. The chemical resistance, tensile strength and resistance to heat distortion improve with increasing acrylonitrile content, while the impact strength is lowered. Generally, commercial products which are presently available and which can be used in the practice of the present invention contain about 10 to 25% by weight of the butadiene-acrylonitrile copolymer with the balance being a styrene-acrylonitrile copolymer.

Another particularly useful form of acrylic resin for the purposes of the present invention is polymerized methyl methacrylate.

Another class of acrylic resins useful for the purposes of the invention are the impact modified acrylics. For example, an acrylic-polyvinyl chloride copolymer can be used, as can a copolymer of methyl methacrylate and alpha methyl styrene. In general, therefore, acrylic resins as a class are useful for the purposes of the present invention as it is their physical rather than their chemical properties which are controlling.

Bonded to the acrylic base sheet 11 is a layer 12 containing an unsaturated polyester resin and glass fibers 13 as well as inert solid particles such as glass beads 14. The unsaturated polyester constituents of the layer 12 can also be any of a variety of compositions. Polyester resins can be based on unsaturated anhydrides and dibasic acids such as maleic anhydride and fumaric acid. They can be based upon saturated anhydrides and dibasic acids, employing materials such as phthalic anhydride, isophthalic acid, adipic acid, azelaic acid, sebacic acid, chlorodenic acid, tetrabromophthalic acid, tetrachlorophthalic acid, hexachloro-octahydromethno naphthalene dicarboxylic acid or nadic methyl anhydride. The glycols which have been used in the preparation of commercial polyesters include propylene glycol, dipropylene glycol, ethylene glycol, diethylene glycol, bisphenol-A adduct, hydrogenated bisphenol-A adduct, neopentyl glycol, and trimethyl pentanediol. The polyester resins may also include monomers such as styrene, diallyl phthalate, methyl methacrylate, vinyl toluene, triallyl cyanurate and chlorostyrene.

Usually the unsaturated polyesters sold in the market in syrup form are solutions of the linear polyester in a monomer. Such resins generally contain an inhibitor which prevents premature polymerization, and setting is accomplished by the injection of a peroxide catalyst, usually a ketone peroxide, which overcomes the inhibition effect.

A particularly preferred polyester resin composition is an unsaturated polyester resin having a viscosity of 500 centipoises or lower at room temperature, and commercially identified as 93-524, marketed by Reichold Chemical Company.

The catalyst used in the polyester composition can be one of the well known peroxide catalysts, particularly methyl ethyl ketone peroxide. This material is normally supplied as a 60% solution of dimethyl phthalate. Other ketone peroxide formulations such as "Aposet 707" and "Lubersol D-224" can also be used. These ketone peroxides are not shock sensitive and are almost completely non-flammable. They have virtually no odor and provide long gel times with short cure times. Generally, the concentrations of catalysts in the formulation will be on the order of 1 to 3%, with 2% being preferred.

The initial polyester coating composition also contains an inert organic solvent diluent, of which acetone is the most preferred example. This diluent should be relatively inert to the polyester in that it does not either accelerate or decelerate the setting reaction or significantly offset the shelf life. At the same time it should have the ability to tackify or etch the surface of the acrylic sheet over which the glass fiber-polyester composition is to be applied. In the case of ABS resin sheets, I can use up to about 12% by volume of acetone although generally it will not be necessary to use more than about 1% by volume.

Also included in the polyester layer bonded to the acrylic sheet are solid inert spheres such as glass spheres in a very finely divided condition. The particle size of the sphere should be small enough so that the particles are readily dispersed in the polyester resin vehicle as a uniform dispersion, and the particle size is sufficiently small to pass through the orifices of conventional spray guns used for the application of polyester resins such as the "Glas-Craft" guns. Generally, the particle size of the glass spheres should not exceed about 1,000 microns and should preferably be on the order of 200 microns or so. The spheres serve to distribute the stress throughout the matrix of the polyester resin and provide for improved impact and strength properties in the finished product. The glass beads should constitute about 1 to 20% by weight of the coating mixture (polyester, catalyst and diluent, and preferably from 1 to 10% by weight).

The glass fibers 13 may be chopped strands, rovings or milled fibers. The glass fibers typically comprise 30 to 60% by weight of the coating composition, and the polyester resin ingredients comprise the remaining 70 to 40% by weight.

The application of the polyester resin-glass fiber composition can be done with the usual type of equipment employing a spray gun such as the "Glas-Craft" gun into which is fed the polyester, a solvent and a catalyst such as methyl ethyl ketone oxide. Glass fibers or rovings are wetted by the solution issuing from the orifice of the gun and are applied over the surface to be coated simultaneously with the binding components.

While the polyester layer 12 is still wet or at least substantially uncured, a syntactic polyester layer 15 is applied over the previously deposited polyester layer 12, preferably by spraying. The syntactic layer includes hollow microspheres 16 to control the density and the weight. When these spheres are mixed with the polyester resin, a strong, lightweight, foam-like material results. This syntactic foam has several advantages. The density of the foam can be accurately controlled since it depends on the volume of microspheres added. The foam is closed cell and free of voids and dense areas. In addition, no chemical blowing agent is required to form the cellular structure, and no gaseous by-products are produced.

The diameter of the hollow microspheres may range up to 1,000 microns or so, but preferably the diameter of the spheres is on the order of 200 microns or less. The spheres may be composed of acrylic-type resins such as polymethylmethacrylate, an acrylic modified styrene, polyvinylidene chloride, and copolymers of styrene and methylmethacrylate. Methods for the production of these hollow microspheres are well known in the art and the microspheres themselves are readily available commercially.

The polyester composition used to form the layer 15 also includes an activator such as one of the aforementioned ketone peroxides, in amounts ranging from about 1 to 3% by weight.

As the polyester containing layers 15 and 12 merge there will be, of course, some diffusion between the two layers so that no sharp line of demarcation will exist between the layers. The polyester setting reaction is the result of an exothermic reaction which may be over in a few minutes or may take several hours. As a result of the heat liberated by the exothermic reaction, the plastic balls 16 are caused to expand and thereby exert sufficient outwardly radial pressure to increase the effective surface contact between the spheres and the surrounding resinous matrix. As the exothermic reaction subsides, and the reaction medium cools, the spheres 16 also cool and consequently tend to shrink but due to the similar coefficients of expansion of the composition of the microspheres and the surrounding polyester matrix, there is no appreciable separation of the matrix from the spheres. There is, however, a significant shrinkage of the spheres upon cooling to set up stresses that greatly enhance the structural strength of the final product. Generally, the plastic microspheres occupy about 1 to 10% by weight of the syntactic polyester layer 15.

The relative thicknesses of the components of the laminate can be varied depending upon the ultimate use to which the laminated structure is to be put. Generally, however, the acrylic sheet 11 will measure from 20 to 125 mils in thickness, and the first polyester layer 12 will be in the same range. The syntactic layer 15 is generally considerably thicker than either the polyester layer 12 or the acrylic sheet 11, and may range generally from 60 mils or so up to 4 inches or even more.

Where it is desired to provide smooth surfaced faces on both sides of the structure, a structure of the type shown in FIG. 2 can be used. This structure includes an acrylic sheet 17 forming one end face of the resulting laminate, and an acrylic sheet 18 forming the other face. A polyester layer 19 containing glass fibers 20 and glass beads 21 is securely bonded to the sheet 17, and a polyester layer 22 is similarly bonded to the acrylic sheet 18. The polyester layer 22 also includes the glass fibers 23 and the glass beads 24.

The composite structure shown in FIG. 2 can be built up from individual three layer structures of the type shown in FIG. 1 and, while the polyester compositions are still uncured, the two panels can be pressed together to form an intermediate syntactic layer 25 containing the hollow plastic microspheres 26. Upon completion of the curing reaction, a rigid laminate results.

The laminated structures of the present invention have wide applicability wherever sandwich-type panels are required. They can be used, for example, for boat hulls, tabletops, bathtubs, wash stands, and the like.

I claim as my invention:

1. The method of making a reinforced plastic laminate which comprises applying a coating composition including an uncured ployester resin, glass fibers and solid inert spheres onto an acrylic sheet, applying over the resulting uncured polyester surface a self-curing composition including a polyester resin, hollow plastic spheres and a curing agent for the polyester, setting the polyesters to form a rigid polyester resin by means of an exothermic reaction which expands the hollow plastic spheres, whereby upon cooling said hollow plastic spheres are left in a stressed state.

2. The method of claim 1 in which said inert spheres are glass spheres.

3. The method of claim 1 in which said hollow plastic spheres are composed of an acrylic resin.

4. The method of claim 1 in which said coating composition contains a solvent which renders the surface of said acrylic sheet tacky.

5. The method of claim 4 in which said solvent is acetone.

6. The method of claim 1 in which both said coating composition and said self-curing composition are applied by spraying.

7. A rigid laminated plastic structure comprising a sheet of an acrylic resin, a first layer of polyester resin bonded to said acrylic sheet, said first layer containing glass fibers and solid inert spheres distributed therethrough, and a second layer of polyester resin bonded to said first layer, said second layer including hollow plastic spheres in a stressed condition.

8. The structure of claim 7 in which said solid inert spheres are glass spheres.

9. The structure of claim 7 in which said hollow plastic spheres are composed of an acrylic resin.

10. The structure of claim 7 in which a third layer of polyester resin, glass fibers and solid insert spheres is bonded to said second layer, and both outer surfaces of said structure are composed of acrylic sheets.

References Cited
UNITED STATES PATENTS

| | | | |
|---|---|---|---|
| 2,850,421 | 9/1958 | Thompson | 117—126 GR |
| 3,046,172 | 7/1962 | Reid | 161—160 |
| 3,150,032 | 9/1964 | Rubenstein | 161—161 |
| 3,276,895 | 10/1966 | Alford | 117—26 |
| 3,316,139 | 4/1967 | Alford et al. | 161—72 |
| 3,340,083 | 9/1967 | Rubitschek | 161—194 |
| 3,541,973 | 11/1970 | Aquarius | 107—8 |

MORRIS SUSSMAN, Primary Examiner

U.S. Cl. X.R.

117—16, 26, 27, 126; 161—194, .5 DIG